United States Patent [19]

Overman

[11] Patent Number: 5,483,472
[45] Date of Patent: Jan. 9, 1996

[54] PORTABLE ELECTRONIC FOOD SHOPPER

[76] Inventor: Anthony J. Overman, 205 E. Casino Rd., Ste. B-20, Box 191, Everett, Wash. 98204

[21] Appl. No.: 58,780

[22] Filed: May 10, 1993

[51] Int. Cl.$^6$ .......................... G06F 15/16; G06F 15/22; G06F 15/24; G06G 7/52
[52] U.S. Cl. .............. 364/705.06; 364/709.02; 364/401
[58] Field of Search .............. 364/705.06, 705.08, 364/706, 709.01, 709.14, 709.12–709.15, 400, 401, 404, 405, 407

[56] References Cited

U.S. PATENT DOCUMENTS

| | | | |
|---|---|---|---|
| 4,156,282 | 5/1979 | Olander | 364/709.12 |
| 4,277,837 | 7/1981 | Stuckert | 364/705.06 |
| 4,959,686 | 9/1990 | Spallone et al. | 364/401 |
| 4,961,158 | 10/1990 | Sussman | 369/709.04 |

Primary Examiner—Tan V. Mai
Assistant Examiner—Emmanuel L. Moise

[57] ABSTRACT

A portable electronic shopping list device with the familiarity of a pocket calculator comprises a display, keyboard with control keys, microprocessor and memory for storage of a library of standard lists and custom lists, input and output port for communication with external devices, and support software. A product is added to a user list by searching and selecting within a standard list or adding a new item not on the list. In a search, entry of each alphanumeric character causes a pointer to advance in the list to the first list item having that character in the same character position in the item name. Alternatively, a user can scroll through a list to a desired item. Item quantity may be entered with the item on the user list as well as item price. Total price sums through the list for reference at any time. Price comparison is also enabled by entering a product price per unit and a second price per different unit with the device determining the lowest price of the two. Required entries are prompted on the display.

1 Claim, 19 Drawing Sheets

PORTABLE ELECTRONIC FOOD SHOPPER

BACKGROUND OF THE INVENTION

The present invention relates to portable calculators and more particularly to electronic list devices with calculator functions specifically employed to develop shopping lists for ease in shopping and comparative price analysis, such as in food shopping.

It is known in the art to have specialized calculating or listing devices such as telephone number lists, calendar reminders, conversion calculators such as for factoring a recipe or converting between metric and English measurement units, calorie calculators, and the like. However, it is not heretofore known to have a portable, electronic, menu-driven, shopping list device with price comparison functions and a customized list retained in device memory.

SUMMARY OF THE INVENTION

Accordingly, it is the object of the present invention to provide a portable electronic shopping list device.

Another object is to provide such a device that facilitates entry of list items by selecting items from a menu stored in memory.

Yet another object is to provide a means of locating an item din the list by searching for characters which spell the item name as each character is entered into the device.

Yet still another object is to provide means to electronically communicate with other devices, for example to receive a new shopping menu or to record a developed menu elsewhere.

And still another object is to provide such a device in combination with calculating means that provides for price comparison of an item offered in different quantities.

A seventh object is to provide for entry and cumulation of item prices with display of a cumulative total.

An eighth object is to provide for item characteristics such as caloric, protein, carbohydrate, fat, cholesterol content of food items, entered by the user, retained in memory, and retrieved upon command.

A last object is to provide such a device with means of recording a quantity desired of an item.

The electronic shopping list device of this invention contemplates a small, portable device with the familiarity of a pocket calculator that achieves these objectives with an electronic shopping list device comprising a display, a keyboard, a multifunction toggle key, and a keypad containing a plurality of control keys providing, in combination with a key redefinition switch, a power switch, scroll switches, delete switches, price entry and price compare sequence enable switches, and a print/receive switch. Functions are supported by microprocessor IC's, RAM's and ROM's, an external communication driver, and program steps retained in device memory.

In operation, a user enters an item on his shopping list by typing the name of the item. The device has 25 lists of up to 50 items each, or 50 lists of 25 items, or other similar combination within this capability range. Each list is named and provided on a lists index, displayed by pressing a "Lists" control key. Any list (or recipe) may be designated by moving a pointer to its name on the index and entering the selection. A list may similarly be deleted by designating its name and entering a "Delete" function key. New lists may be entered by adding its name in the list index by moving the pointer to an unused index line and typing its name of up to 14 characters.

Within each list, items may be entered either by typing the item name or selecting an item from a standard list stored in device ROM (Read Only Memory module) known in as the Quik Pik library, consisting of 428 prestored items. The display is first cleared by entering an "Input" key. As each character of an item name is then entered, it is displayed on the first of four lines of a LCD (liquid crystal display). Simultaneously, the device searches for items that match the name being entered. Items are listed alphabetically in device memory. As the first character is entered, an internal pointer locates the first item beginning with that character which item is then displayed on the second line of the LCD. As the second character is entered, the pointer moves in the internal list to the first item that has the same first and second characters. This character entry, search and display routine is continued for up to 15 characters until the item desired is found in the function control switch. As implemented, the first keyboard functional level addresses and inputs the alphanumeric characters 1 through 0, U through Z, a space character, a "Quant" or quantity key, an up arrow key and a down arrow key. The second level of the keyboard provides for entry of alphabet characters A through T.

The keypad 4, shown in FIG. 1, includes a "2ND" or second function (key redefinition) switch, for enabling a second definition of keypad and keyboard functions. The switch toggles between first and second function options by subsequently pressing the key. The primary function set provides switches "Delete" for deleting an item from the list, "Lists" displaying device lists from its memory, "$" for entering price data for an item, display control "Scroll" function key for scrolling up (or advancing) indicated by a "down" arrow. Secondary function switches, or those functions accessed by first exercising the "2ND" switch, are, respectively, "D. List" for deleting an entire list, "Compare" for initiating the logic sequence for entry of data and calculating results for price comparison, "Search" for searching through the list for an item, "Scroll" for scrolling down (or backing-up) indicated by an "up" arrow, and "Input Output" for entering an entry from the keyboard or keypad or in combination with the "2nd" function key for enabling communication with external devices through a device communication port. list (appearing on the LCD second line) and is selected by the user, or the user completes the name as a new item not previously found in the list. Alternatively, the user may choose to type one or two characters to quickly move through the list and then scroll a few more items to his desired item for selection. It is seen that the list may be used for any shopping item, grocery and nongrocery, simply by entering a item name. Although the device is oriented toward grocery shopping, it can also be used simply as a general purpose electronic list with a wide variety of applications.

In addition, the LCD displays the name and characteristics of the menu item retrieved, entered data, and calculational results. As the primary means of communicating with the user, it may also show device status, instructions, mode of operation, and other similar items of significance. As noted, the display unit is typically a LCD with capability to show 4 lines of text; however, the display could be of any other suitable display technology, and the display dimensions and capability can vary to accommodate the demands and conveniences of the user and application.

The electronic shopping list device further includes a keyboard, control switches, and a digital communication port. The keyboard is conventional, limited only by the capability of the supporting electronics. In the embodiment shown, it is a 4×5 matrix keyboard supported by a second The "Scroll" key is also programmed to be multifunctional. Pressing the key once will move the list up by four items or to the end if less than four items remain to the end of the list. Pressing the "2ND" key and the "Scroll" key will move the list down by four items or to the beginning if less than 4 items remain on the list before its beginning.

To enter a quantity of item on the list, a cursor on the display, actually a line number on the list, is placed adjacent a selected item and the "Quant" key is pressed. A blank line is then opened below the item with the symbol "Q" to the left, prompting a quantity to be entered. After a quantity is entered from the keyboard, (4 characters), the display prompts unit of measures, such as "cu" for cups, "fo" for fluid ounces, "ga" for gallons. The unit of measure is selected by scrolling through the choices with the "up arrow" or "down arrow." Entering the unit is by depressing the "Input" key, as is the case for registering all entries.

When the "Compare" key is activated, the display unit displays on three lines:

Price Compare

Item A

Input Quantity= prompting the user to enter the quantity of the first item A. The numbers scroll left to right so if a mistake is entered, correction is entered by simply reentering numbers while the error disappears from the display. Pressing the input key enters the correct value. The display then shows the entered value and adds on the display fourth line Price $ prompting the user to similarly enter price. The procedure is then repeated for entry of a second item B after which the device derives a price per quantity in common terms and indicates the less expensive item and the user is informed on the display unit Item A [or B] is best buy or Items are equal (items have the same unit price)

or

Invalid numbers (one of the entries was zero).

The "$" key is activated to obtain a running total of prices of list items selected. Prices are input for each item by the user and are shown to the right of the quantity entry. The running total is displayed at the end of the list. Price input is effected as with the quantity function by placing the line number cursor at the item and then pressing the "$" key. Numerals (4) are entered and ended with the "Input" key.

Keypad 4 also includes an "Input/Output" switch for initiating input or output logic to the digital communication port for transmitting from or receiving to the shopping list device through an input/output port, for example to a printer or computer. Pressing the "2ND" key and then the INPUT/OUTPUT key enables communication through the communications port, presently a standard RS232 serial port. After entering the serial port, the user may type "R", "T", or "I" on the keyboard Entering "T" will cause the unit to transmit an entire list. Entering "I" will cause the unit to transmit only the item pointed to by a cursor on the display unit. Entering "R" will cause the unit to begin receiving data through the serial port. Pressing the "INPUT/OUTPUT" key causes the serial port to close the receiving mode. After input or output is completed, the unit returns to the item list.

After entering an item name, a search-through a list may be effected by entering characters after entering the "Search" command after entering the "2ND" key, by scanning through the list arranged in alphabetical order by successive alphanumeric name characters.

The shopping list device can also be used more generally as a record keeper. For example, to use it to accumulate money spent at several stores, initiate a store list, name the stores in place of products, and enter an amount spent in place of product price. The total spent is then automatically summed at the end of the list. Similarly, a calorie count of foods consumed could be listed with total calories summed at the end of the list. Calories expended could be recorded in the product description line and totally separately. Also, longer term lists may be retained and printed, such as a personal home storage inventory and used to guide subsequent purchase needs. Also, a record of standard meals consumed could be kept for a given time period (day, week, etc.) by entering reference codes instead of a product name as data on a list line.

DESCRIPTION OF THE PREFERRED EMBODIMENTS

The electronic shopping list device of this invention comprises a device housing in which are mounted a display, a keyboard, a multifunction toggle key, and a keypad containing a plurality of control keys, a serial port, and a power switch. Functions are supported by microprocessor IC's (Integrated Circuit), RAM's (Random Access Memory) and ROM's (Read Only Memory), an external communication driver, and firmware and software program steps retained in device memory.

Figure 1:
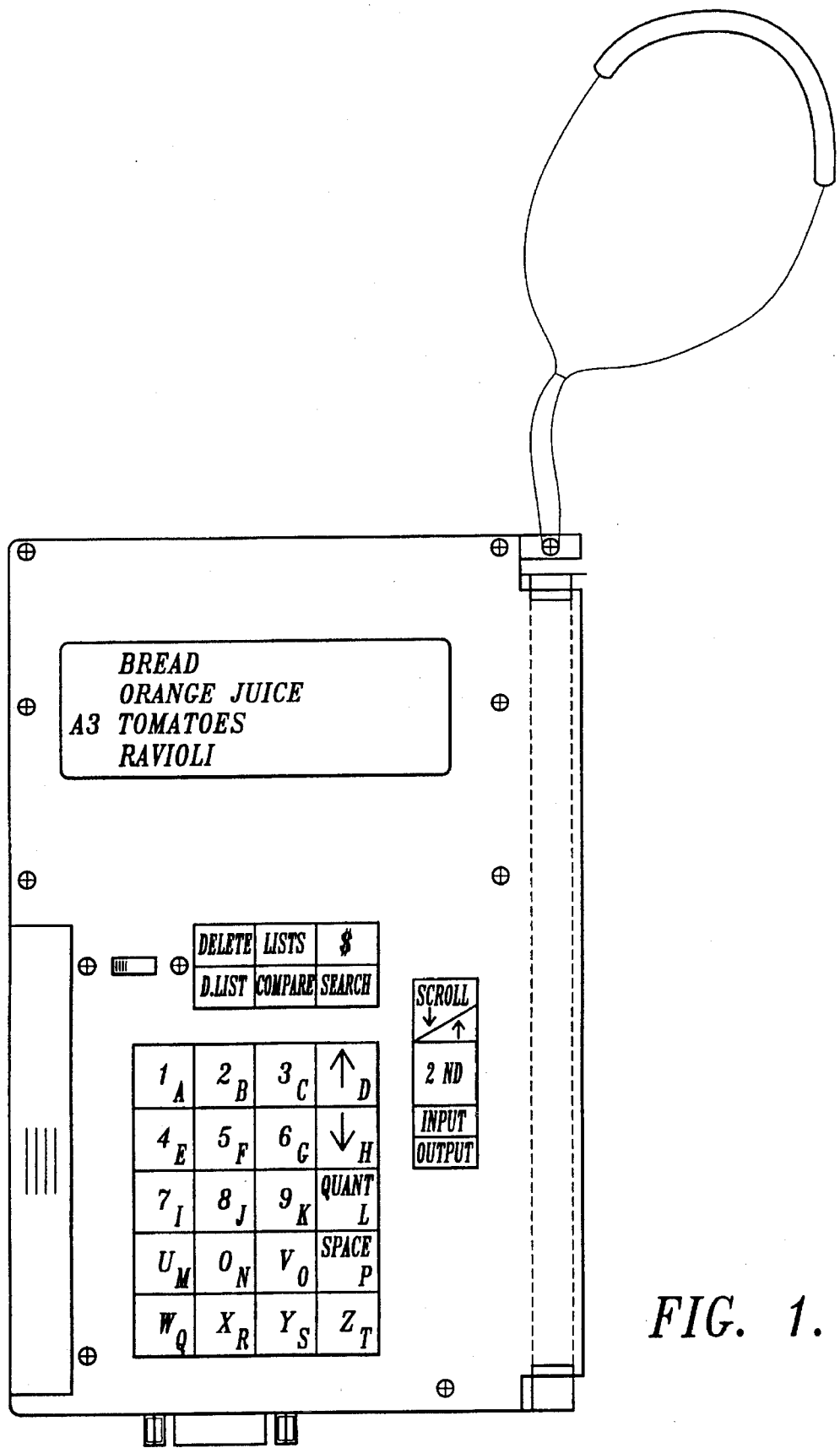
FIG. 1 is an external view of one embodiment of the invention showing keyboard, display, control switches and electronic communication port.

Digital communication port may be any suitable protocol and connector format. In the embodiment shown in FIG. 1, a DB-9 connector used with the standard RS232 serial digital communication format is shown which conserves valuable space over other conventional connectors which are significantly larger. The protocol implemented and communicated through this connector is the RS-232 standard.

Figure 2:
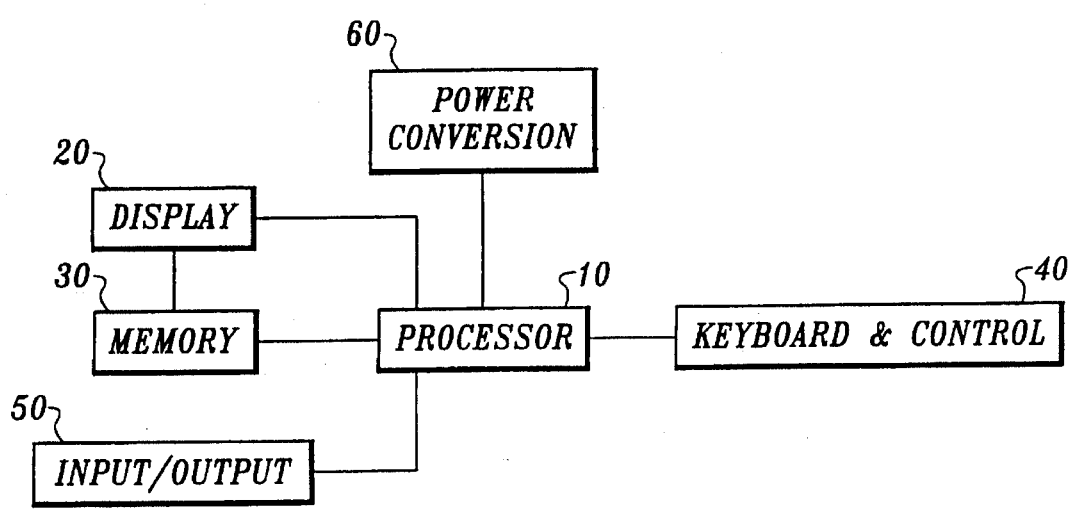
FIG. 2 is a block diagram of implementing electronics showing grouped functional elements.
Figure 3A:
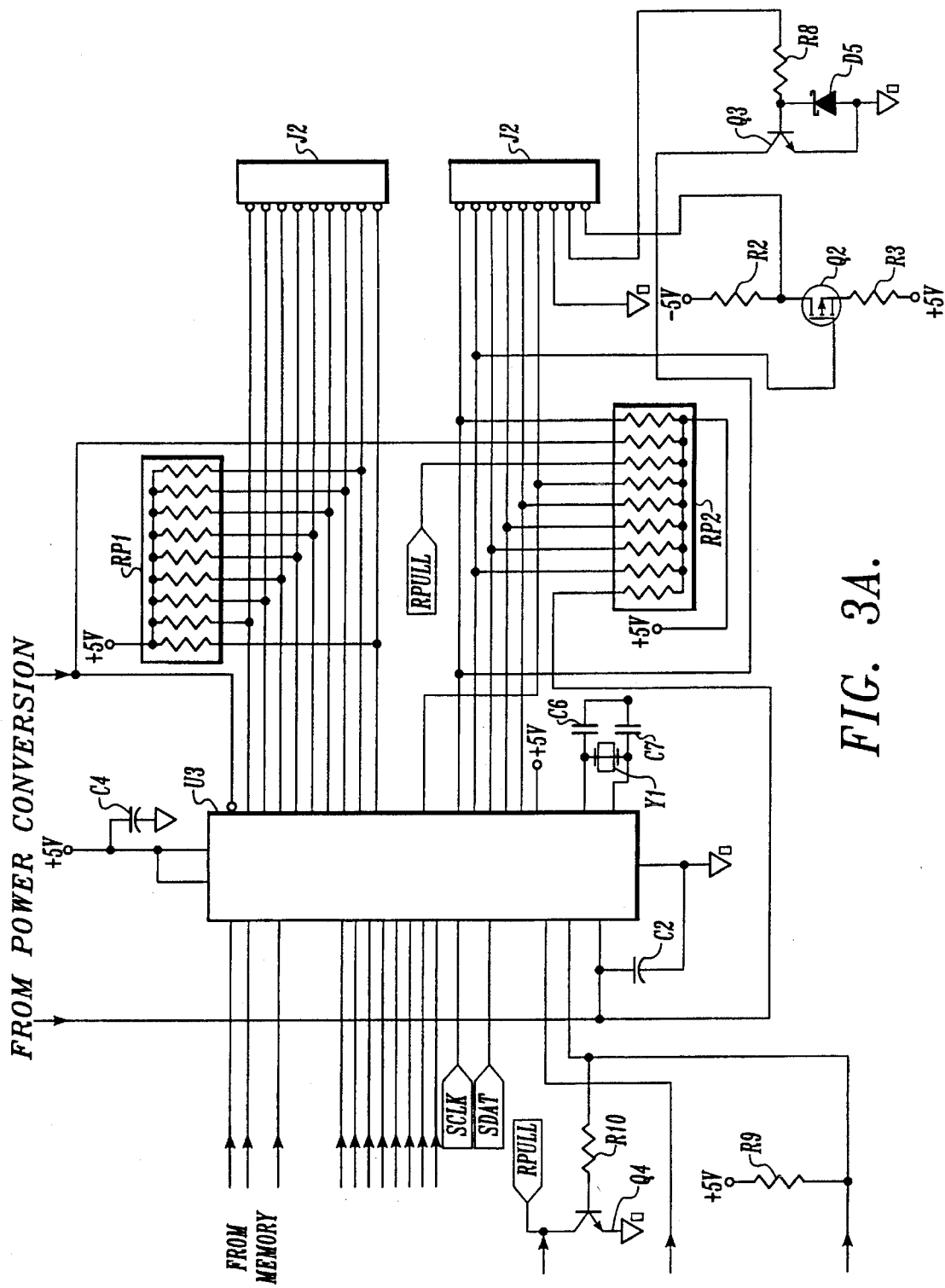
FIG. 3a through FIG. 3c are schematic diagrams of said embodiment of the present invention.

Considering now the implementing electronics of the device, FIG. 2 shows in functional block format a 8-bit single chip microprocessor 10, which in this embodiment is a Motorola MC68HC705C8, in communication with a 20 column LCD 20, a 2K×8 SRAM (Static Random Access Memory) 30, a keyboard and control section 40 comprising in this embodiment a 4×5 matrix keyboard and a 1×6 control switch keypad, and a RS232 input/output section 50. A power conversion unit 60 is also shown. Added detail is shown in FIG. 3a through FIG. 3c.

Figure 3B:
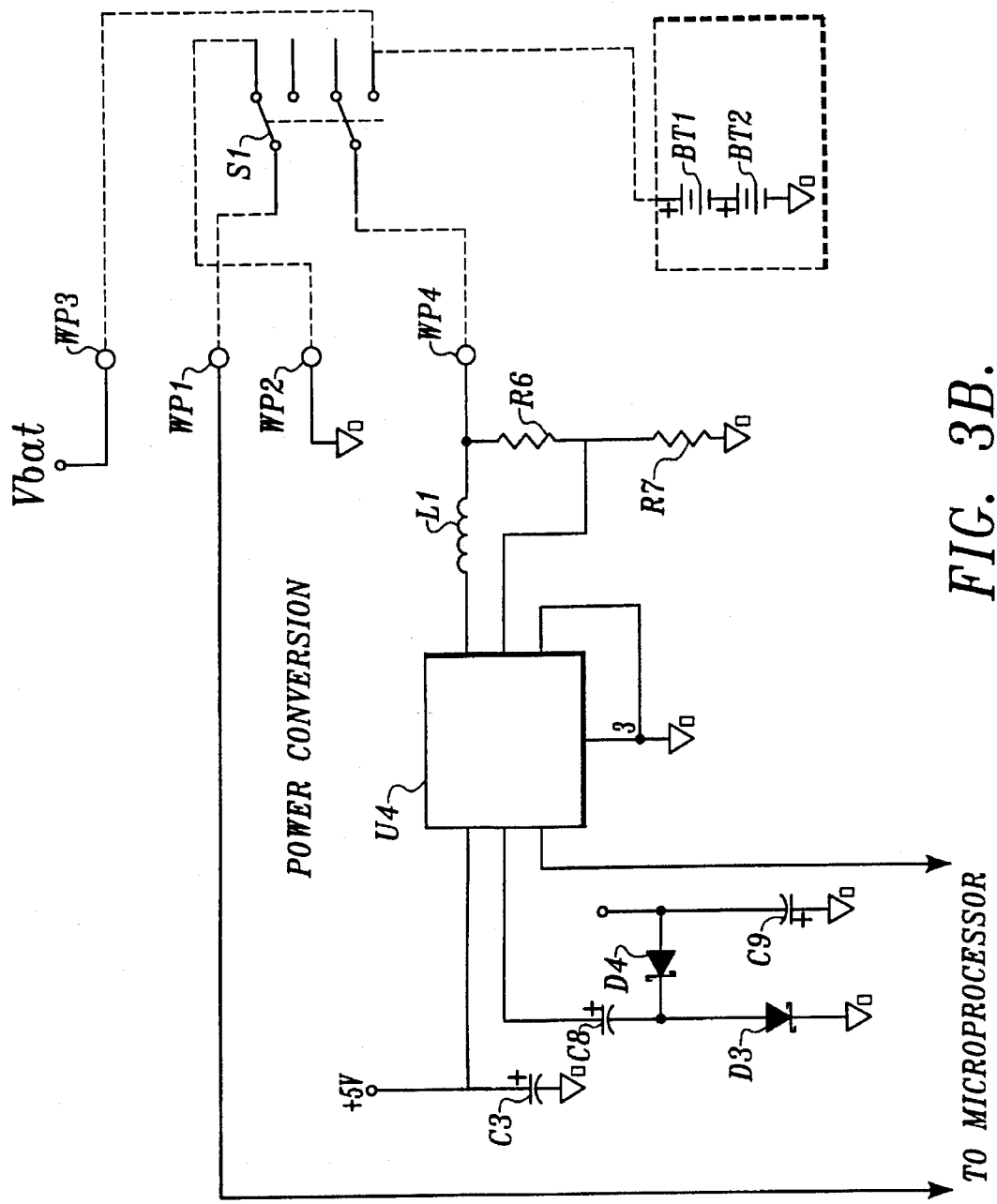
Figure 3C:
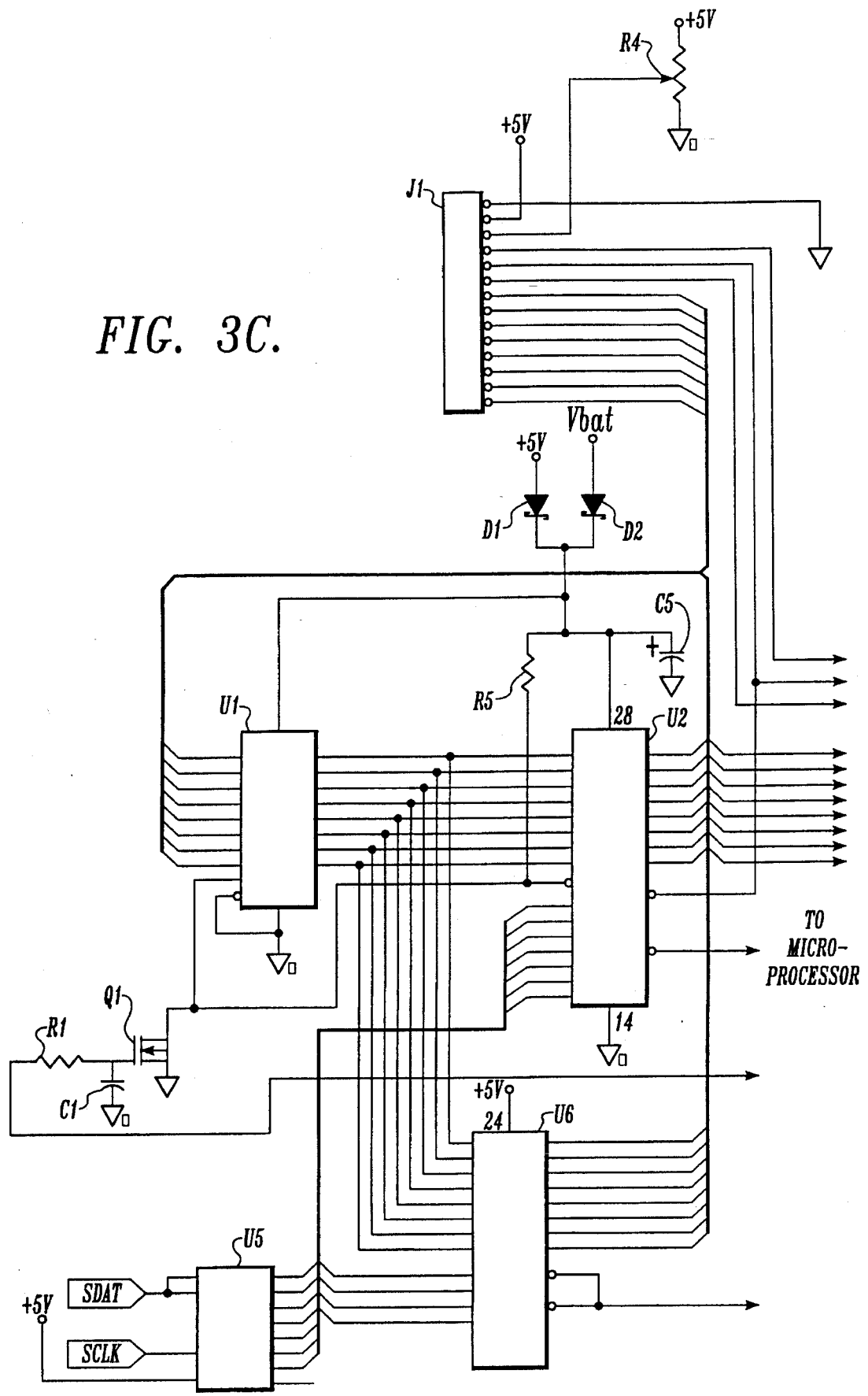

Referring first to the power conversion segment 60 in FIG. 3b, power conversion IC, MAX631BCP, U4, in conjunction with Cadell-Burns 7070-37 inductor L1 and filter capacitor C3, converts "Vbat" (battery voltage) to "+5 V" over a "Vbat" range of 1.8 VDC to 5.5 VDC. Cadell-Burns 7070-37 inductor L1 is used by power conversion IC U4 as the energy storage device in the conversion of "Vbat" to "+5 V" and "−5 V." Power conversion IC U4 converts "Vbat" to "−5 V" using first and second capacitors C8 and C9 and third and fourth Schottkey diodes D3 and D4 to invert the voltage. Filter capacitor C3 is used to rectify the output of power conversion IC U4. Also shown are resisters R6 and R7 which together form a voltage divider, which voltage drives pin 1 of power conversion IC U4. Power conversion IC U4 is designed so that when the voltage on pin 1 is less than 1.31 VDC, pin 2 will be driven to a logical "LOW," signaling that "Vbat" is low and batteries should be replaced.

Referring next to FIG. 3a, self-contained single chip microcomputer IC U3, implemented in this embodiment with Motorola MC68HC705C8, are shown two keyboard input devices, J2, in this embodiment a 4×5 keyboard and the 1×6 control key board. Included in the microcomputer IC U3 is an EPROM nonvolatile memory which contains operations and application software which is diagramed logically in FIG. 4a through FIG. 4n. Stored words representing shopping items are stored in memory device U6. Shown connected to U3 are resistor packs RP1 and RP2, used to pull up voltage from the 4×5 and 1×6 keyboard lines into microcomputer IC U3 to "+5 VDC." Also shown connected to microcomputer IC U3 are ceramic resonator Y1, first ceramic capacitor C6, and a second ceramic capacitor C7 which are used with the internal oscillator of microcomputer IC U3 to generate the system clock required for microcomputer IC's operation.

Also shown connected U3 are first N-channel depletion-mode FET (Field Effect Transistor) Q2, second N-channel depletion-mode FET R2, and third N-channel depletion-mode FET R3, used when the device outputs data through the RS232 serial port. First N-channel depletion-mode FET Q2 is used to convert the serial signal from a logical LOW to HIGH range of 0 to 5 V to −5 to +5 V, the standard RS232 levels. Second N-channel depletion-mode FET R2 pulls the drain of A2 to −5 V, limiting the "RS232 OUT" current to about 225 microamps when the output is −5 V.

Referring next to FIG. 3c, SRAM IC U2, a HMM6116ALP 2048-byte (8-bit byte) is used by microcomputer IC U3 to store item list parameters and pointers. SRAM IC U2 has the feature of "low voltage retention" which means it will maintain its memory intact if the voltage to its pin 28 drops to no lower than +2.0 VDC. The switching circuit of first and second Schottkey diodes D1 and D2 and first and second batteries BT1 and BT2 (shown as reference in FIG. 3b) provides this voltage during power OFF. Also shown is Transparent-latch IC (74HC573) U1 whose outputs follow its inputs when its control pin is logically "HI" and holds input values on 8 output pins when its control pin is logically "LO". This allows the microcomputer IC U3 to output the lower 8 bits of a SRAM IC memory address (for a read or a write execution) and to hold that address while the memory is being addressed.

In FIG. 3a and FIG. 3c is shown communication data bus J1 connected to microcomputer IC U3 and the memory IC's U1 and U2. The communication data bus J1 is for connection to a display unit, in this embodiment, a 4-row Hitachi LM044L Liquid Crystal Display. This is a conventional display module that accepts 8-bit ASCII alphanumeric information from microcomputer IC U3 across communication data bus J1 for display or for display control, such as cursor positioning or screen blanking. A conventional potentiometer R4 is also connected for contrast adjustment.

Figure 4A:
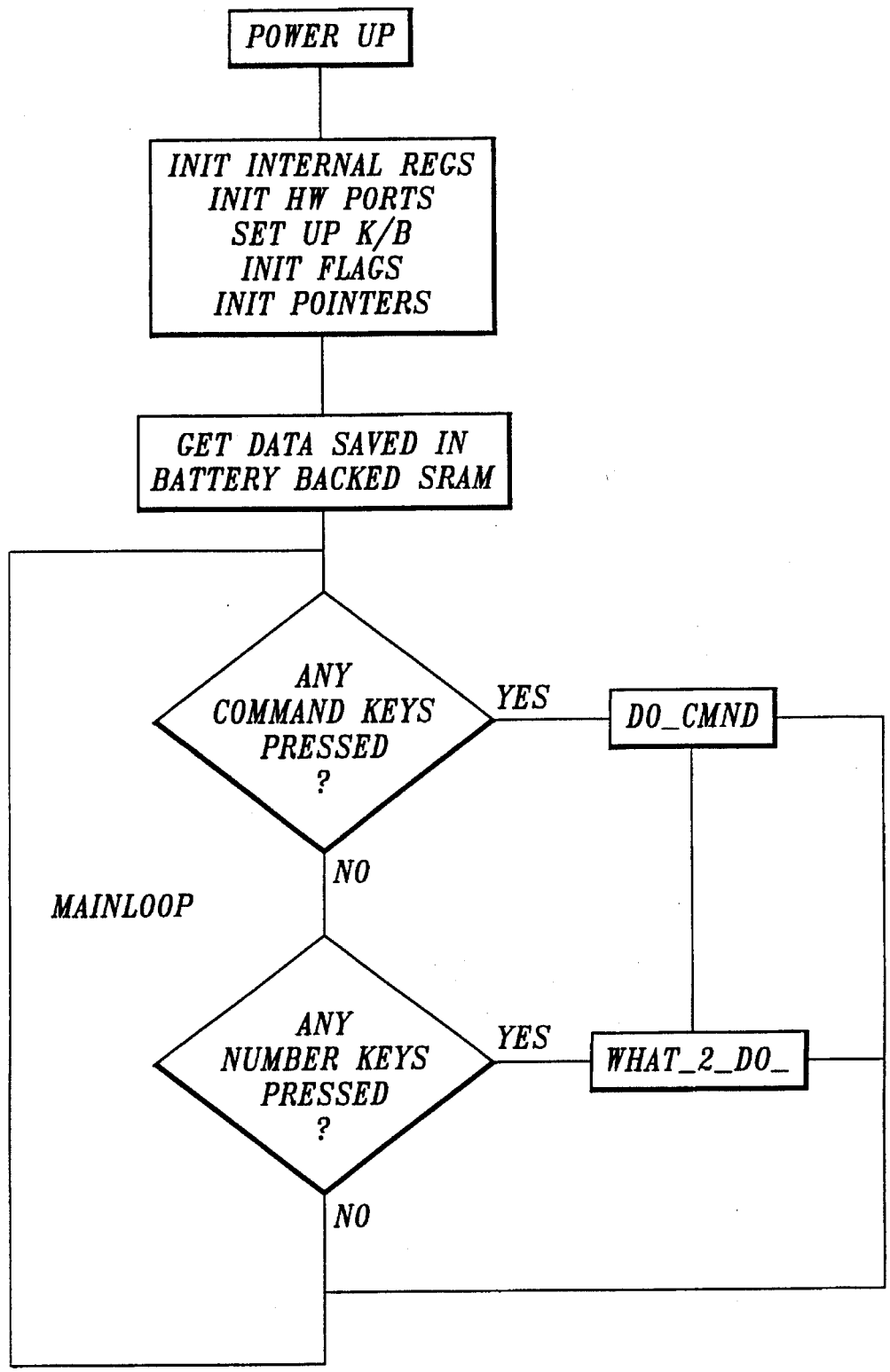
FIG. 4a through FIG. 4n are a logic flow charts of supporting software of the present system.
Figure 4B:
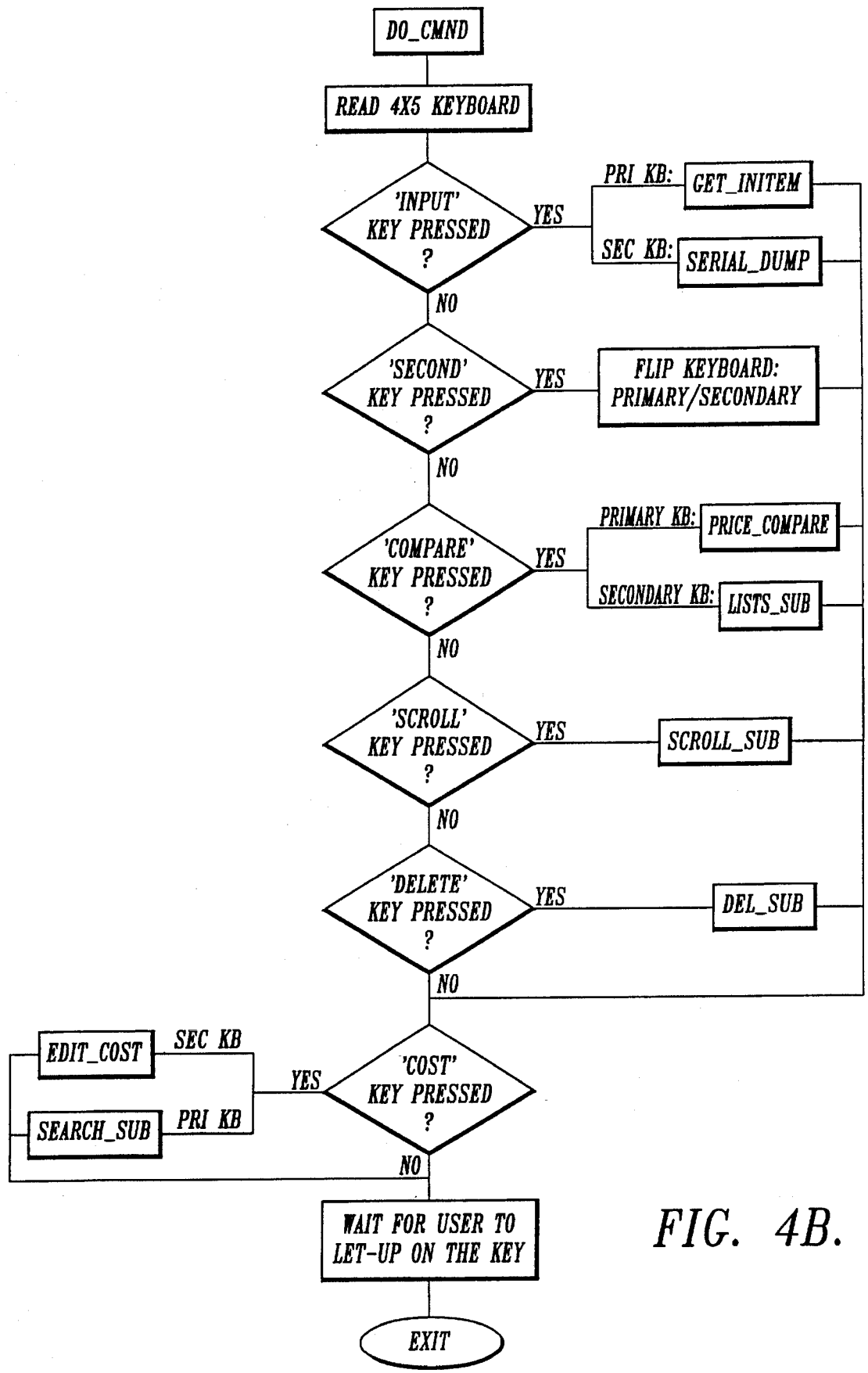
Figure 4C:
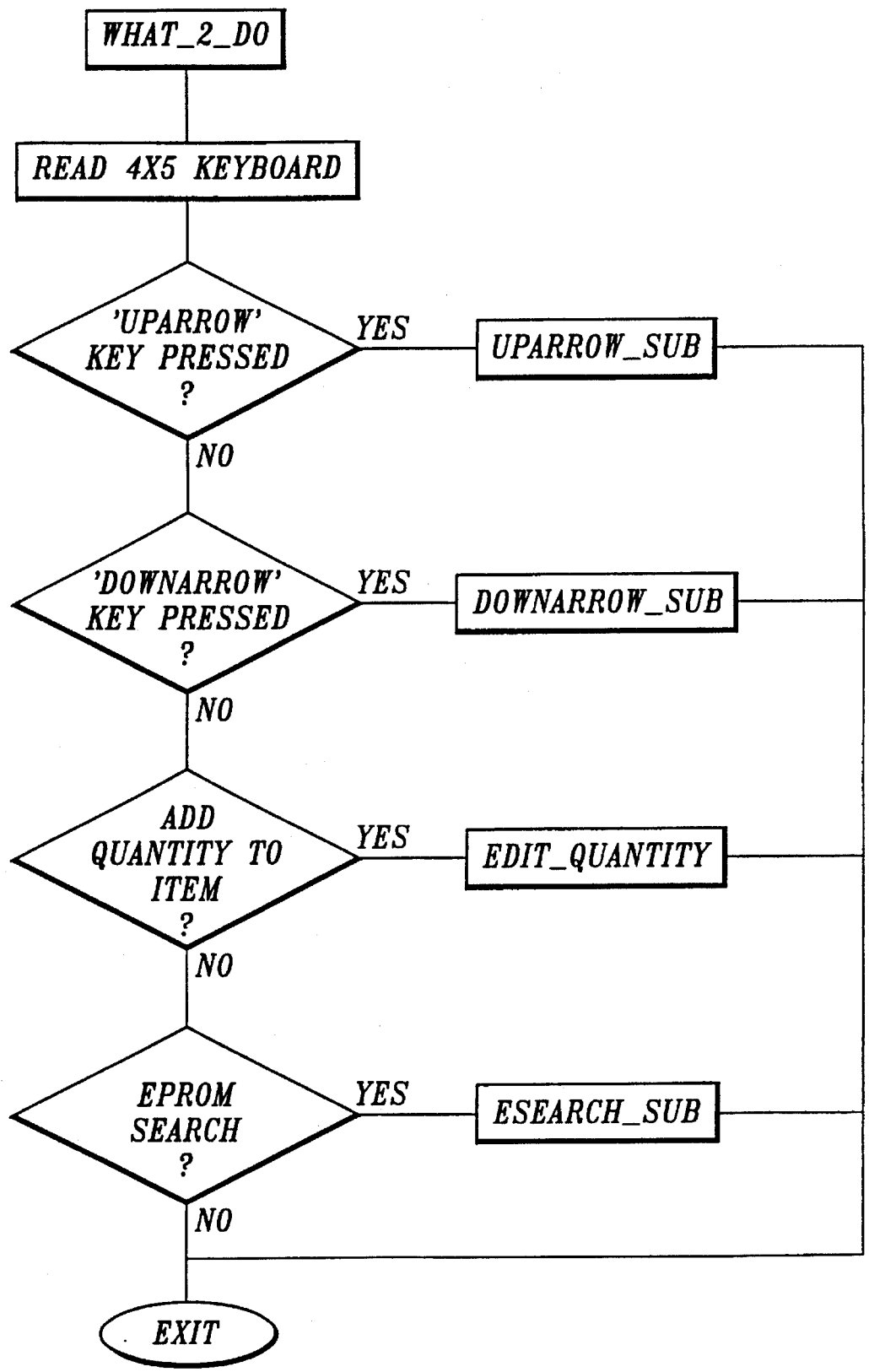
Figure 4D:
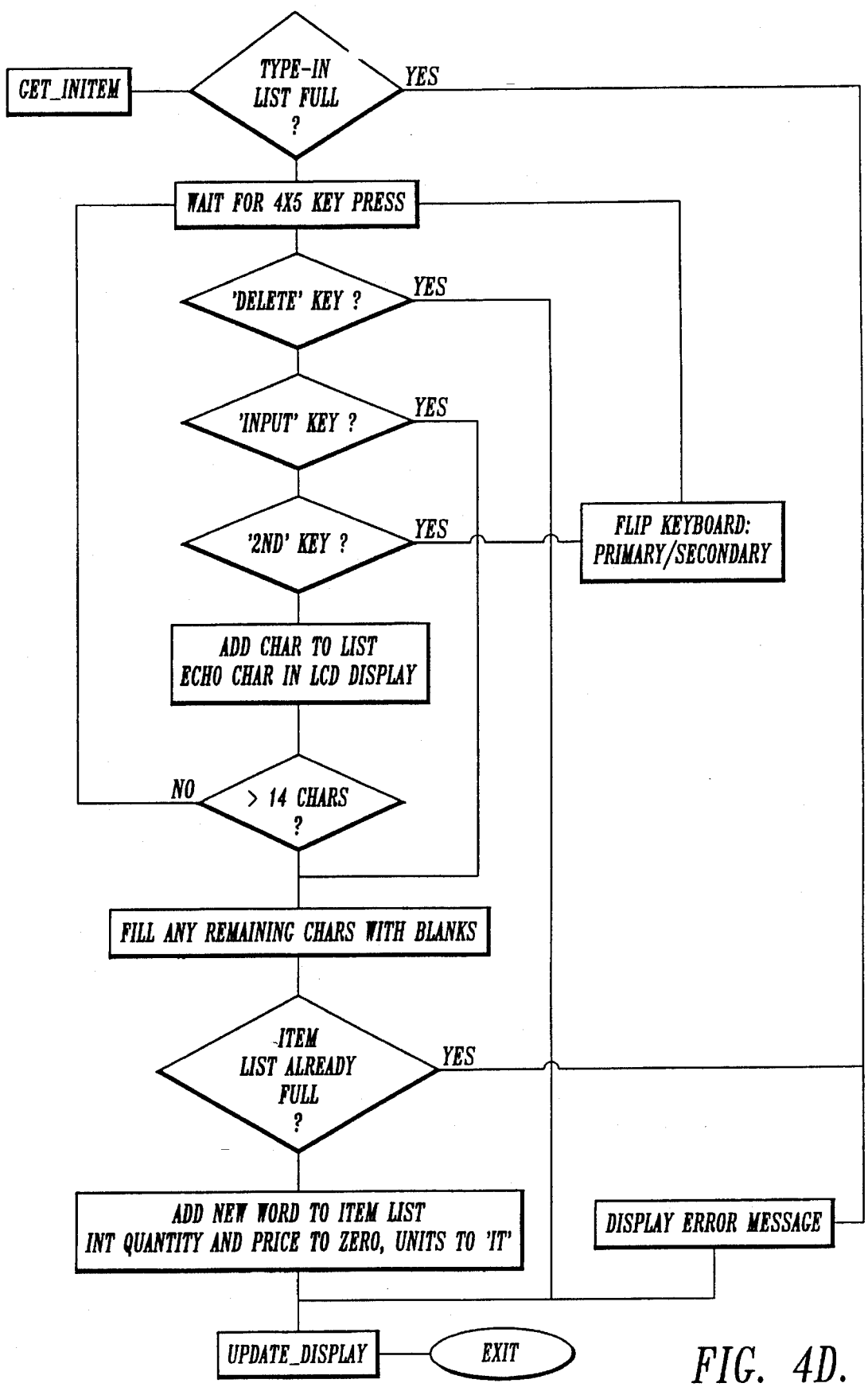
Figure 4E:
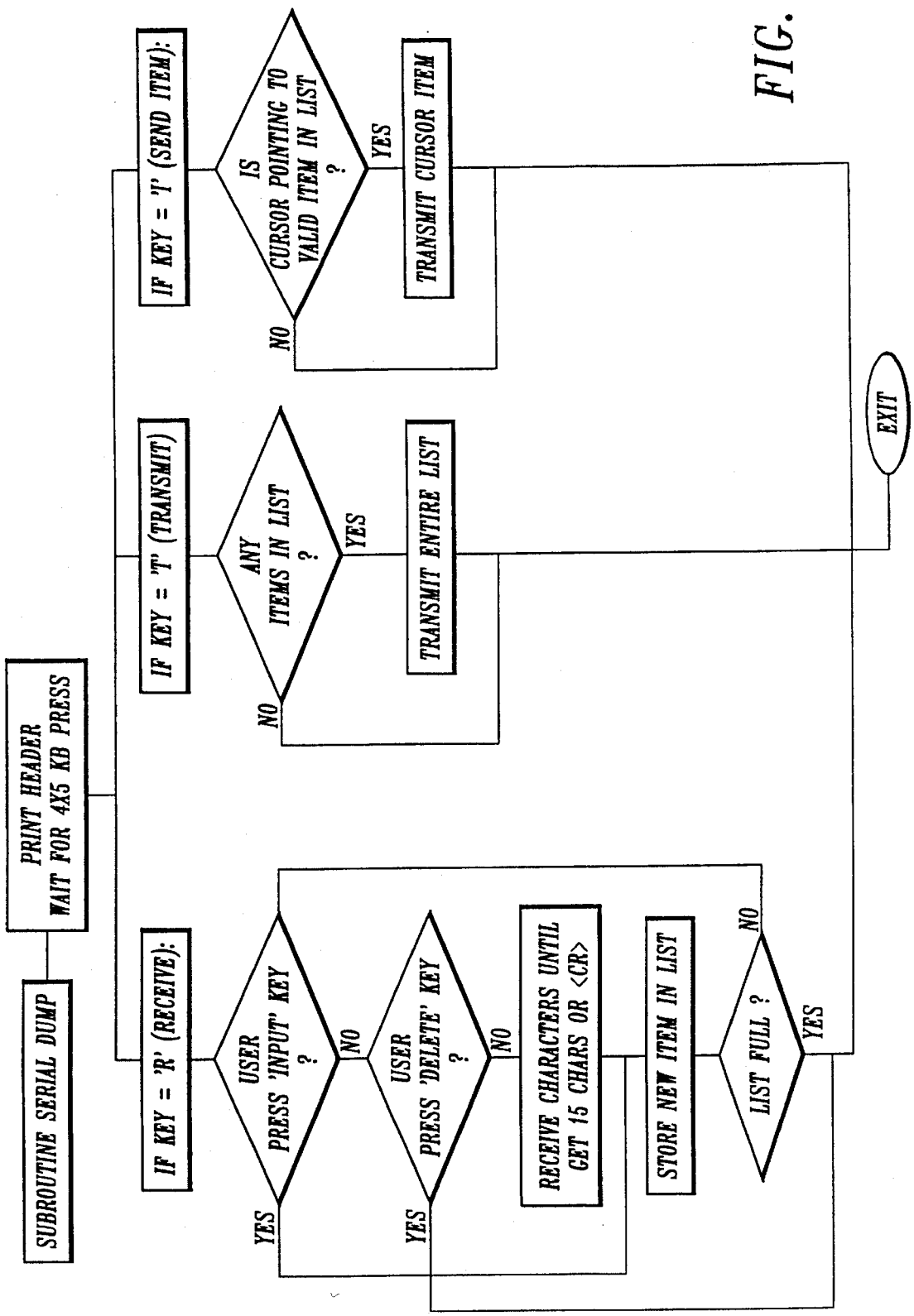
Figure 4F:
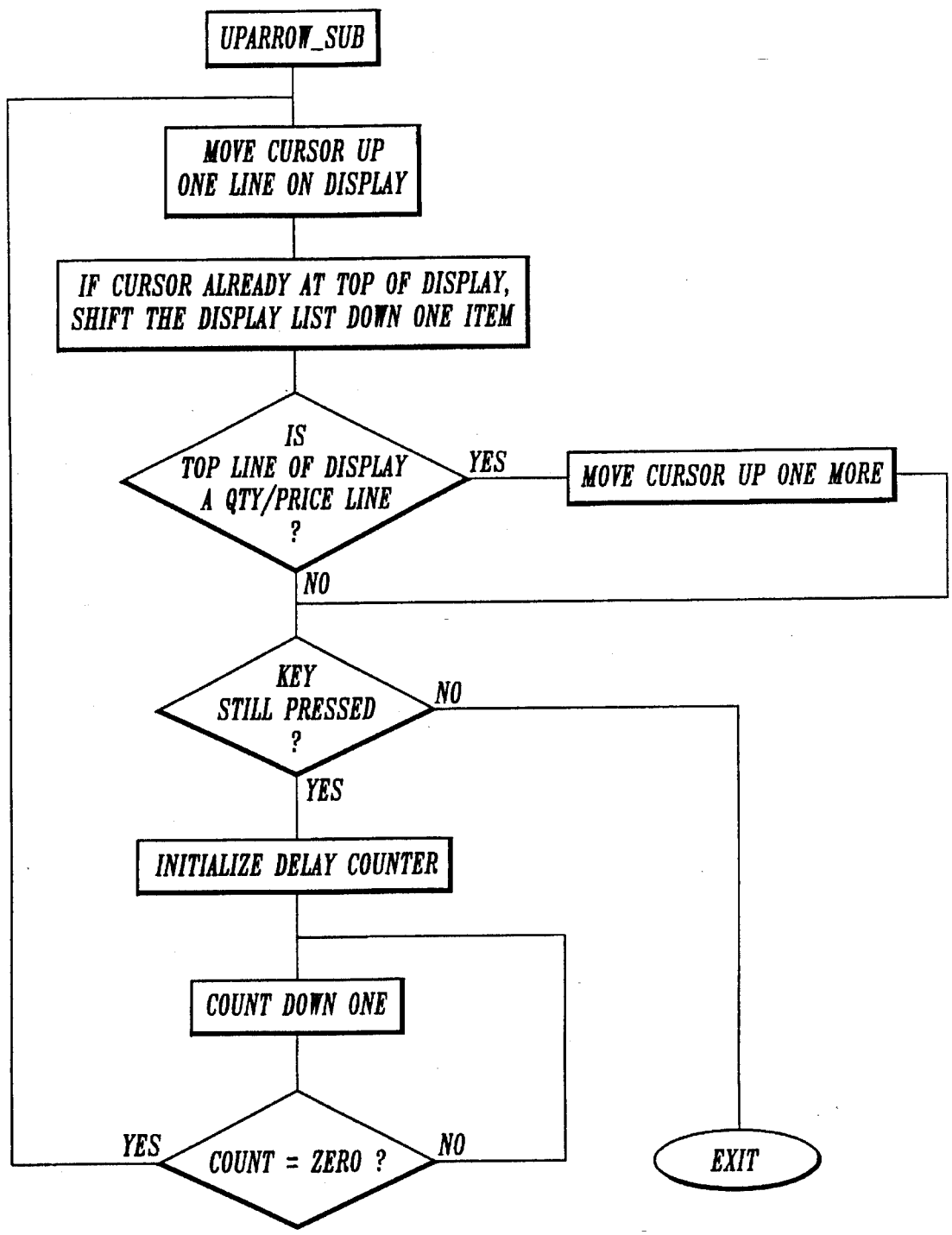
Figure 4G:
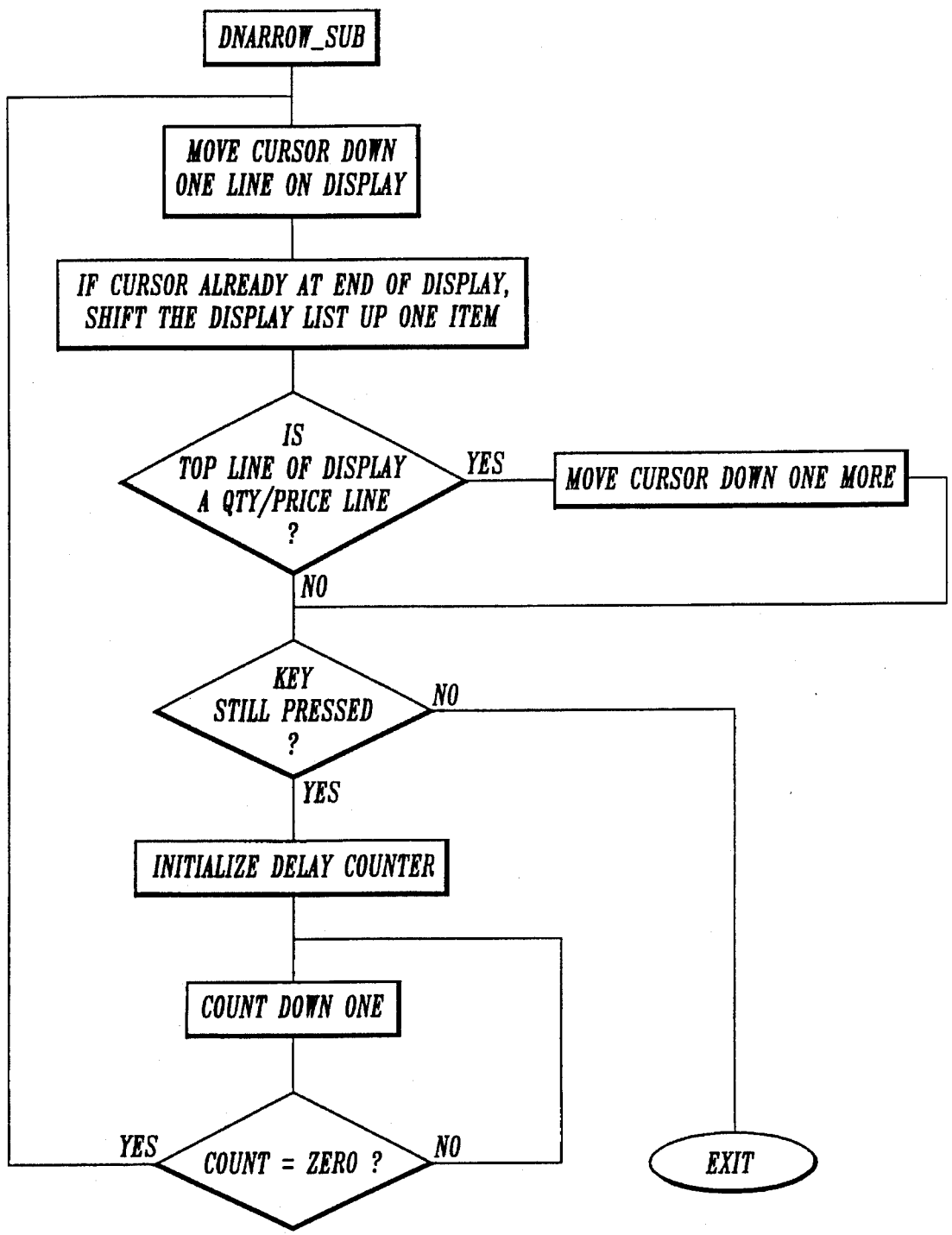
Figure 4H:
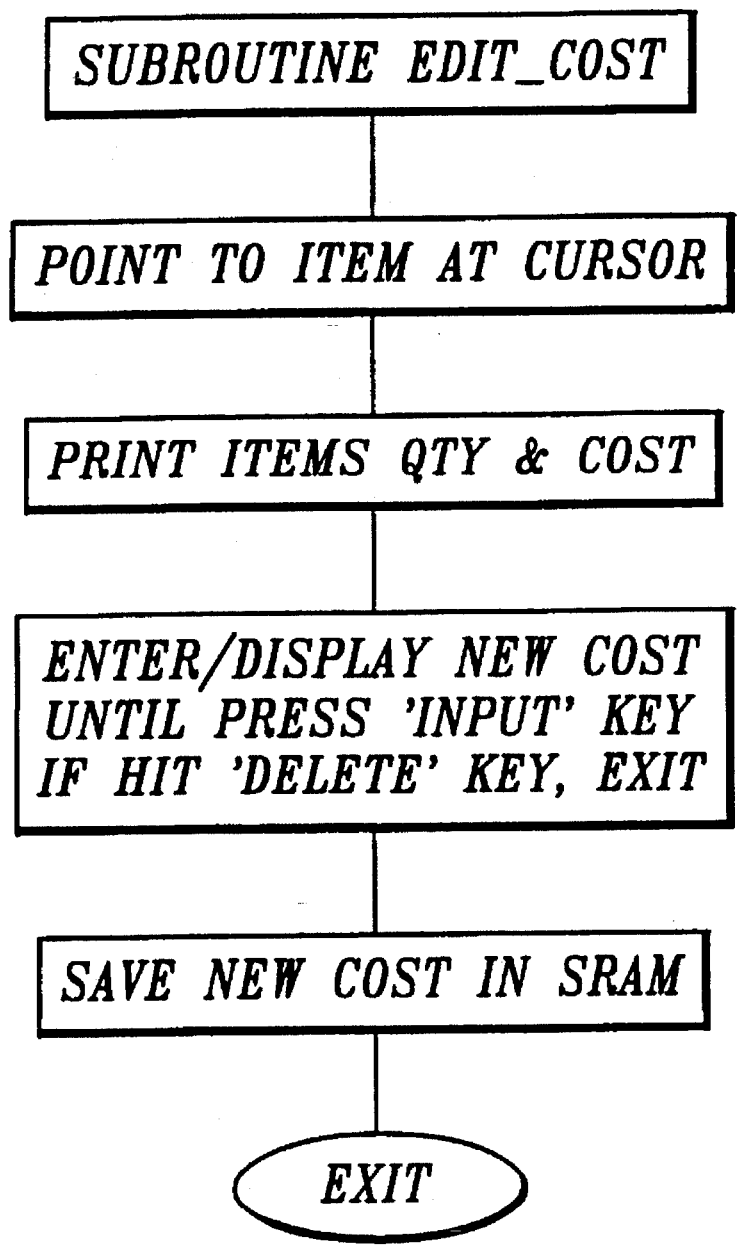
Figure 4I:
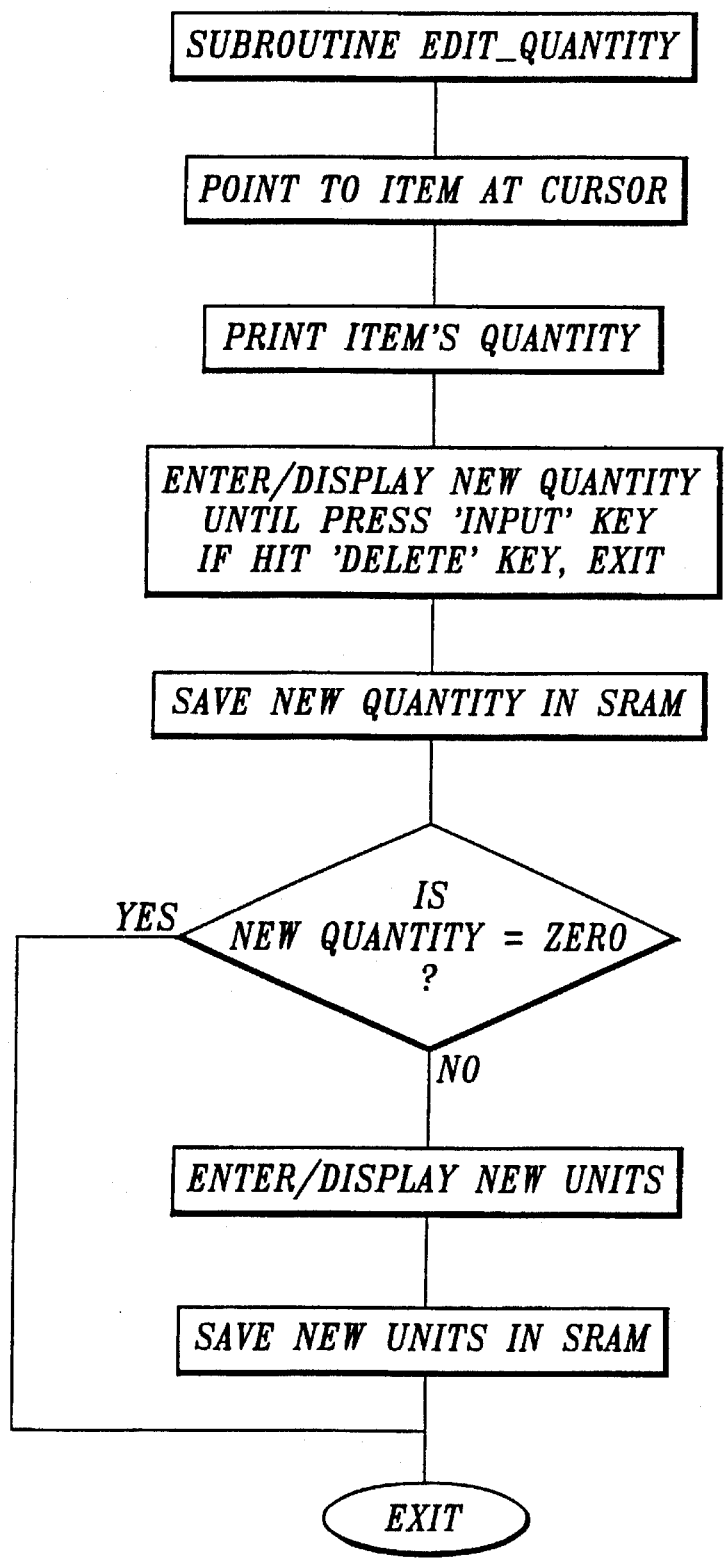
Figure 4J:
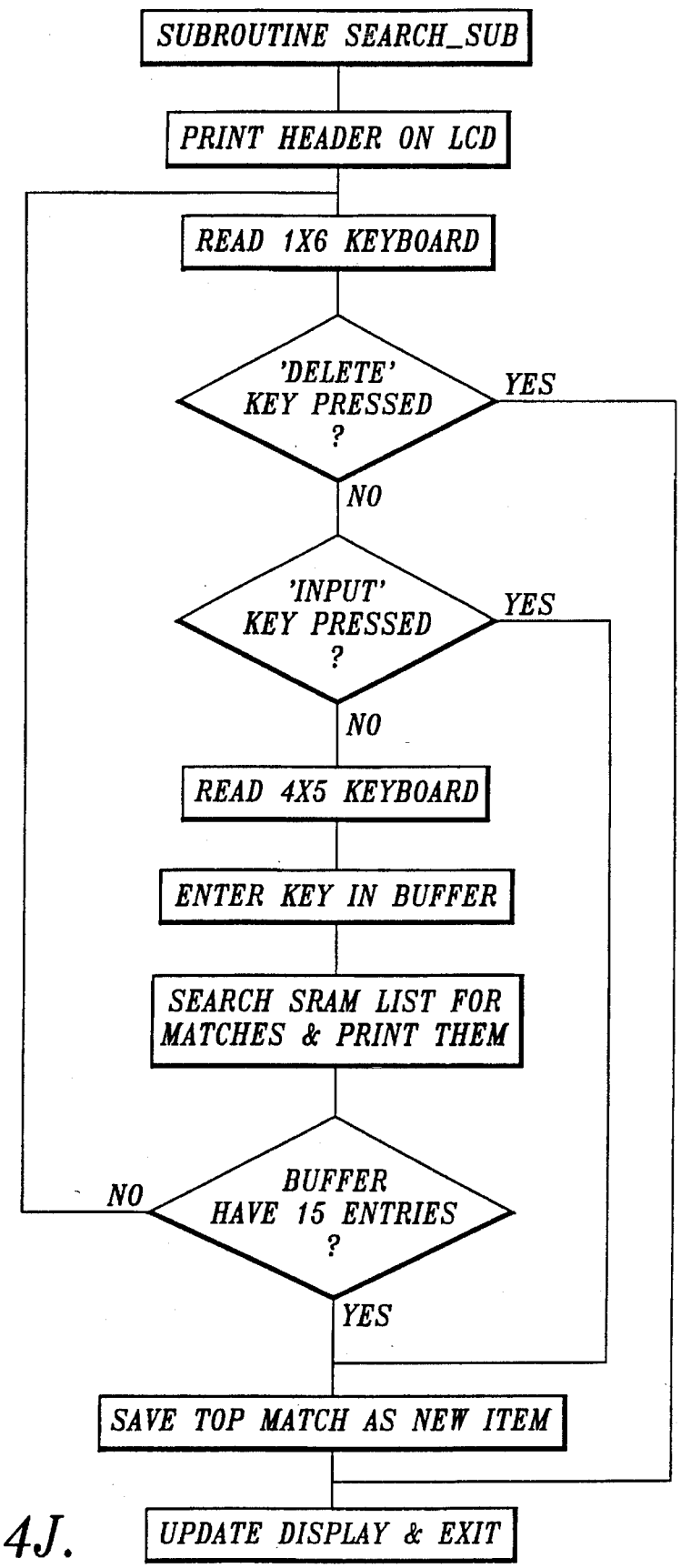
Figure 4K:
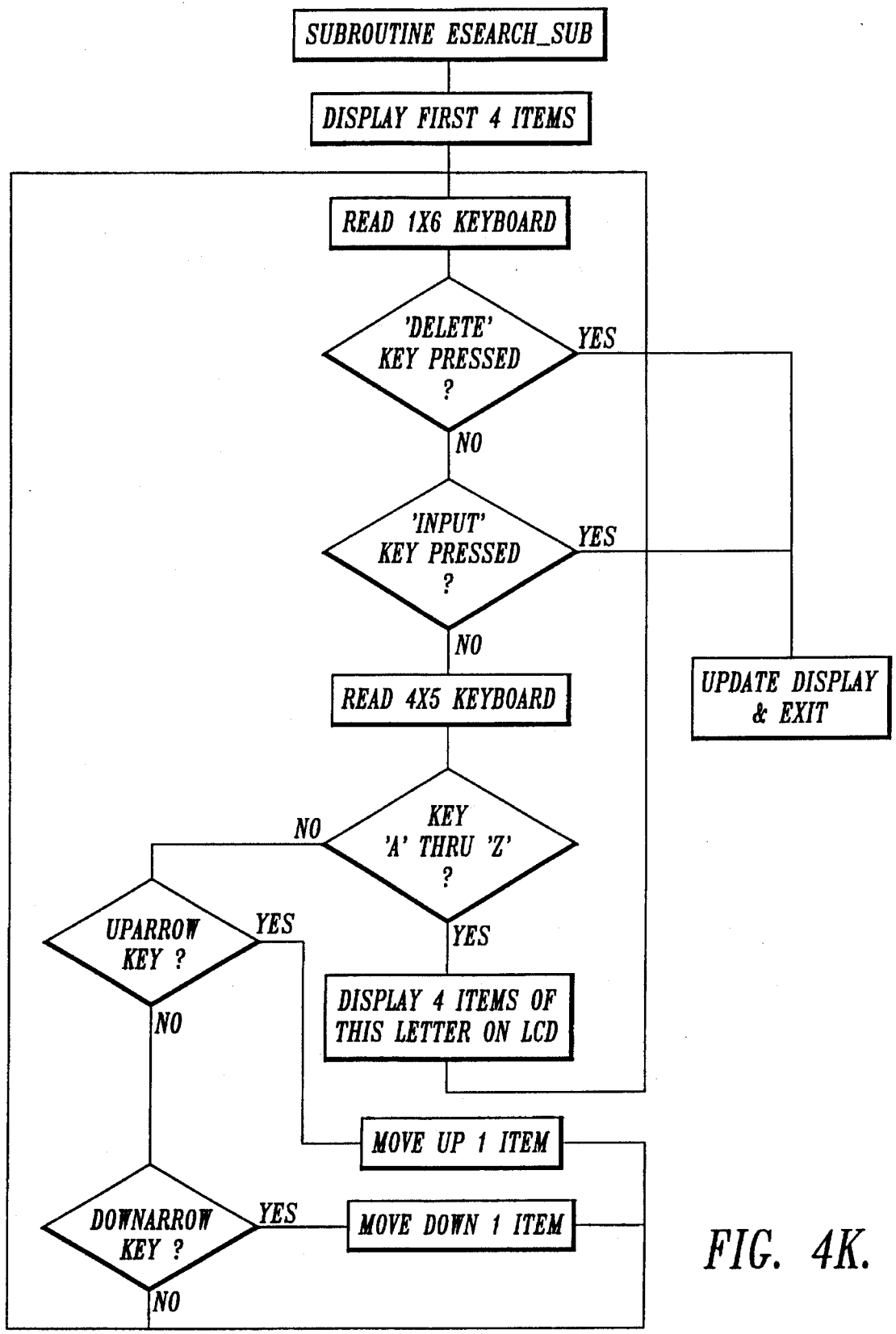
Figure 4L:
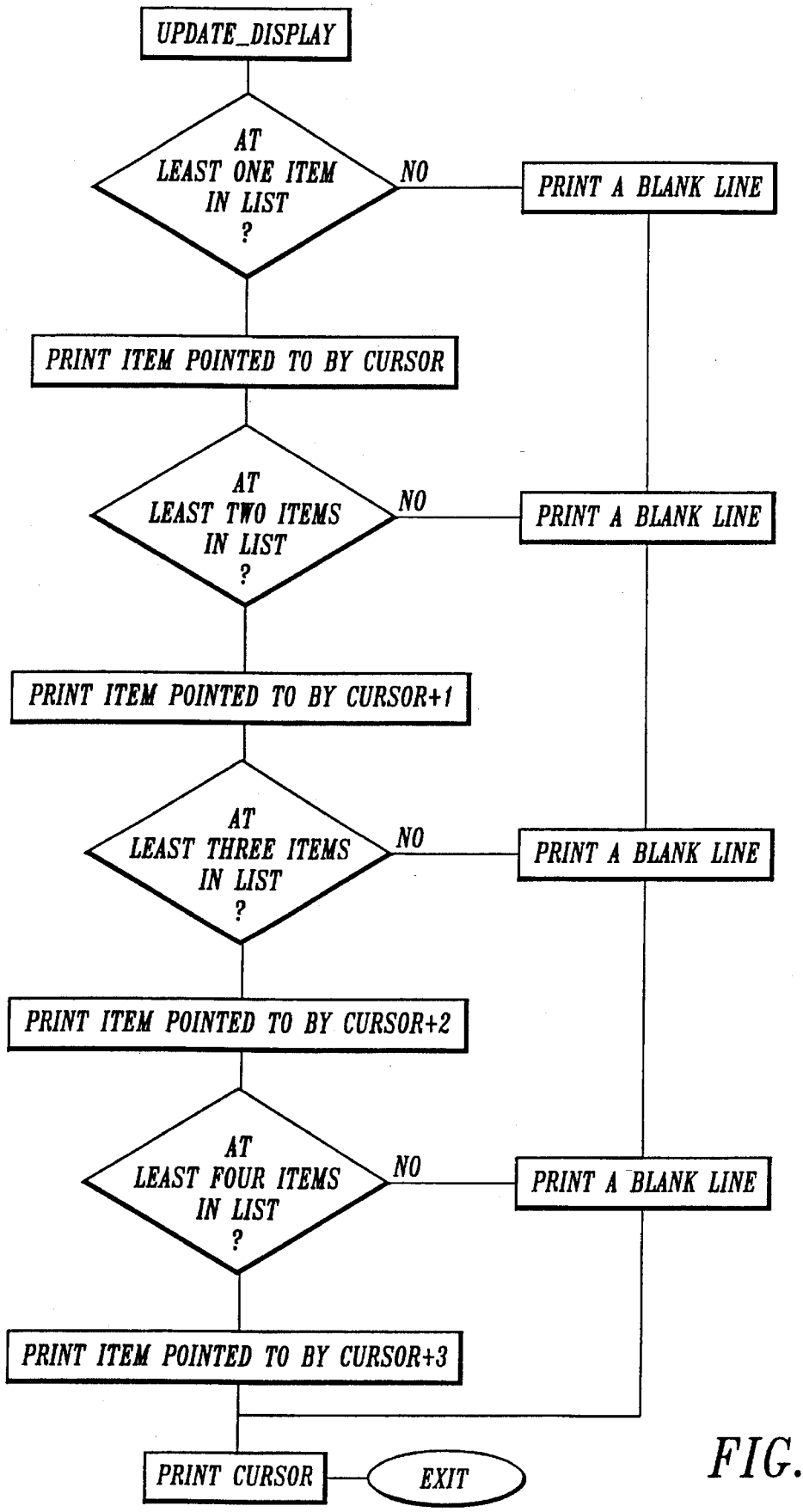
Figure 4M:
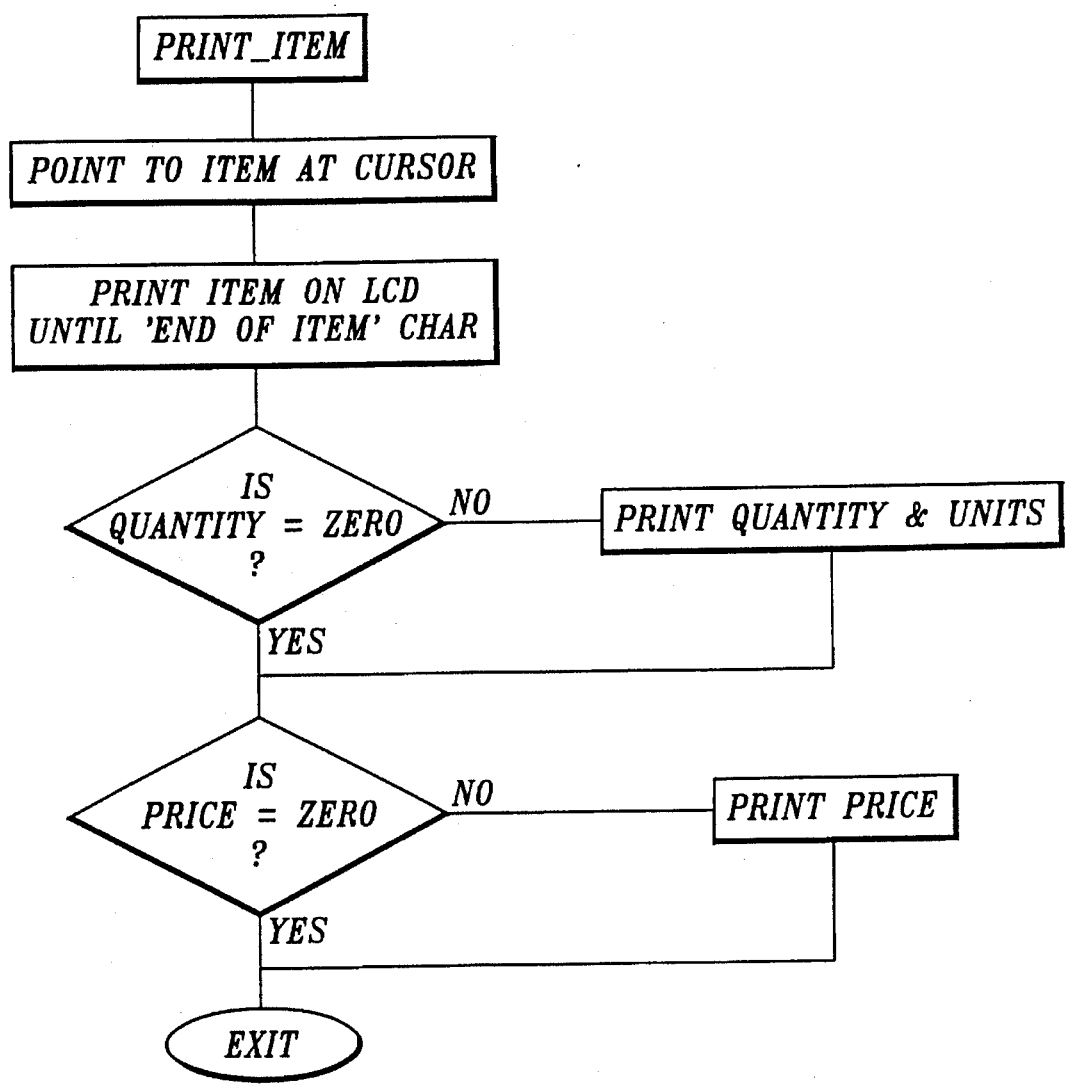
Figure 4N:
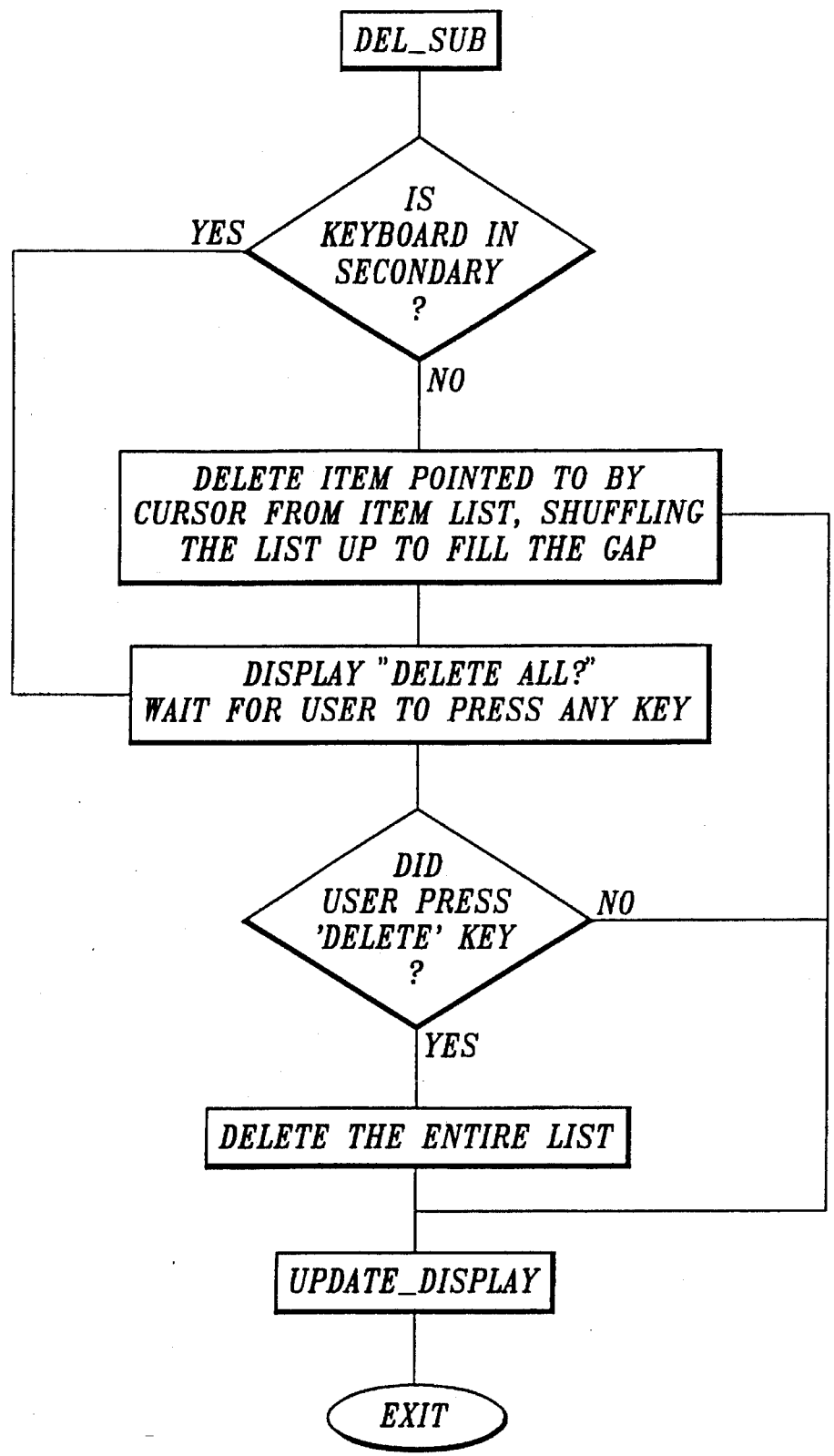

Turning now to the implementing software, FIG. 4a through FIG. 4n outlines in logic flow the operation of the several software routines. FIG. 4a illustrates the control program from power on, followed by initiation routines and loading of saved data and then into the main control loop comprising of two logic branches to determine if a key has been pressed, one for command keys and one for number keys, a negative response leading to continuation through the loop, a positive response causing a branch to execution of a "DO_CMND" or "WHAT_2_DO" routine, respectively.

FIG. 4b illustrates logic operation of the DO_CMND routine, after initiating a read of the 4×5 keyboard, through a series of logic branch steps, a negative response to each causing the logic to continue to the next logic query, the logic queries asking in order whether certain keys have been pressed, being "INPUT", "SECOND", "COMPARE", "SCROLL", or "DELETE" keys. A positive response to the first query causes a branch to execute routines "GET INITEM" or "SERIAL_DUMP", depending on whether the primary or secondary keyboard definition is active. A positive response to the second query causes key definition to flip from a primary set to a secondary set. A positive response to the "COMPARE" query causes execution of either "PRICE_COMPARE" or "LISTS_SUB" routine, again depending on whether the primary or secondary keyboard definition is active. A positive response to the next query causes execution of the "SCROLL_SUB" routine. A positive response from the "DELETE" query causes execution of the "DEL_SUB" routine. After execution of the branch routines, control is returned to the main logic line after the "DELETE" query, after which is another logic branch which checks if the "COST" key has been pressed, a positive response to which causes execution of "SEARCH_SUB" or the "EDIT_COST" routine, depending on whether the primary or secondary keyboard definition is active, and then returns logic flow to the main logic line. The logic line then waits until the user releases the depressed key and then exits back to the main control loop.

FIG. 4c illustrates the WHAT_2_DO routine, showing the initial step is to read the 4×5 keyboard, followed by a series of 4 logic branch queries, "UPARROW KEY DEPRESSED", "DOWNARROW KEY DEPRESSED", "ADD QUANTITY TO ITEM" and "EPROM SEARCH", a negative response to each causing logic to flow to the next until the routine is exited after the last. A positive response to each causes execution, respectively, to the "UPARROW_SUB", "DOWNARROW_SUB", "EDIT_QUANTITY", "ESEARCH_SUB" routines.

FIG. 4d illustrates the GET_INITEM routine, shown first to check if a list is full, if so, then branching to execution of a error message on the display and executing the routine after updating the display, the last operation in the routine before exiting. If the list is not full, the routine waits for a 4×5 keyboard key to be depressed and then checks if the depressed key was a "DELETE", "INPUT", or "2ND" KEY, causing a branch on a positive response from the first query to exit the routine, from the second to below key input queries executing the operations for exiting the routine, and from the third to flip the definition of keyboard keys between primary and secondary. Negative responses causes the entered character to be added to the list and echo the character on the display. If less than 14 characters have been entered, the logic returns to waiting for key input, otherwise the routine is ended with execution of the operations for executing the routine: filling the remaining character positions with blanks, adding a new word to the item list, initiating quantity and price values to zero, unless the list is full in which case an error message is displayed. The routine is then normally exited with update of the display.

FIG. 4e illustrates routine "SERIAL DUMP" first executing a print header and then waiting for keyboard input. Three keyboard entries are permitted: "R", "T", or "I". A "R" response then queries if "INPUT" key has been depressed, if so a new item is stored in the list, if not, the query is if "DELETE" has been depressed, if so the routine is exited, if not, keyboard entries are accepted up to 15 characters or until a carriage return character is entered, after which the newly defined item is added to the list. If the list is full the routine is exited, if not logic is returned to the "INPUT" key query.

A "T" response then causes the list to be transmitted unless there are no items in the list. A 'I' response causes the item indicated by a cursor on the display to be transmitted unless it is an invalid item. In both cases, the routine is exited after transmission or failure to transmit.

FIG. 4f illustrates execution of the UPARROW routine, begun with the cursor moving up one item on the display unless the cursor is already at the top of the display, in which case the list is shifted down one item. If the top line of the display is a quantity or price line, then the cursor is moved up one more line. The routine is then exited unless the key remains depressed, in which case control is returned to the top of the routine after a delay sequence is completed.

FIG. 4g illustrates execution of the DNARROW routine, begun with the cursor moving down one item on the display unless the cursor is already at the bottom of the display, in which case the list is shifted up one item. If the top line of the display is a quantity or price line, then the cursor is moved down one more line. The routine is then exited unless the key remains depressed, in which case control is returned to the top of the routine after a delay sequence is completed.

FIG. 4h illustrates the "EDIT_COST" routine which is a series of executions without branches: the item indicated by the display cursor is selected, recorded quantity and cost for that item is displayed, new cost value is entered until the "INPUT" key character is encountered at which time the new value is recorded in memory and the routine is exited, unless a "DELETE" character is first encountered in which case the routine is exited without recording the new value.

FIG. 4i illustrates the "EDIT_QUANTITY" routine which is also a series of executions: the item indicated by the display cursor is selected, recorded quantity for that item is displayed, new quantity value is entered until the "INPUT" key character is encountered at which time a new value is recorded in memory the quantity is "zero" or unless a"DELETE" character is first encountered in which cases the routine is exited without recording the new value. The quantity unit of measure is then similarly entered, displayed and saved.

FIG. 4j illustrates the routine "SEARCH_SUB", begun by printing a header on the LCD display. Entry from the 1×6 keyboard is then accepted. If the entry is the DELETE key, the display is updated and the routine is exited. If the entry is the INPUT key, the last item searched and identified is saved as a new item, the display is updated and the routine is exited. Otherwise entry from the 4×5 keyboard is accepted and entered in a buffer. The SRAM is searched for a matching character in the same character position and the successful match is displayed. Logic is returned to read of the 1×6 keyboard until the buffer has 15 entries at which time the last selection is recorded as a new list item, the display is updated and the routine is exited.

FIG. 4k illustrates routine "ESEARCH_SUB", begun with display of the first 4 items on the list. Entry from the 1×6 keyboard is then accepted. If the entry is the DELETE key or the INPUT key, the display is updated and the routine is exited. Otherwise entry from the 4×5 keyboard is accepted. If the entry is alphabetic, 4 items having this letter are displayed and control is returned to read of the 1×6 keyboard. If the entry is the UPARROW key, the list and cursor is moved up 1 item; if the entry is the DOWNARROW key, the list and cursor is moved down 1 item, in any case control is returned to read of the 1×6 keyboard.

FIG. 4l illustrates the "UPDATE_DISPLAY" routine prints up to 4 lines of list items from the cursor plus 3 lines, printing blank lines for those lines not having list items within the set of 4 lines. The cursor is also displayed and the routine is then exited.

FIG. 4m illustrates the "PRINT_ITEM" routine. The item identified by the display cursor is displayed. If the item quantity and price values for the item are nonzero, the values and the quantity unit of measure are displayed before the routine is exited.

FIG. 4n illustrates the "DEL_SUB" routine. If the secondary keyboard definition is active, "Delete All? " is displayed and response is awaited. If the response is positive, the entire list is deleted unless the DELETE key is first entered. If the primary keyboard definition is active, the item indicated by the display cursor is deleted from the list and the list is shifted to fill the gap. The display is then updated and the routine is exited.

FIG. 4j illustrates the routine "SEARCH_SUB", begun by printing a header on the LCD display. The SRAM is searched for a matching character in the same character position and the successful match is displayed. Logic is returned to read of the 1×6 keyboard until the buffer has 15 entries at which time the last selection is recorded as a new list item, the display is updated and the routine is exited.

Having described the invention, what is claimed is:

1. A method of electronically selecting, listing, and displaying shopping items with price and quantity to be purchased in an electronic device that includes a keyboard input section with means for inputting alphanumeric characters for entering items on a list and control commands, including a List key, a display means for displaying shopping list items, command prompts, and calculational results, and keyboard input section entries, device memory means in which is stored a master list of consumer items stored in said device memory means from which a user can select items a plurality of user-prepared lists prepared by transferring items from said master list and by user entry from said keyboard, an index of said plurality of user-prepared lists stored in said device memory means, data retrieval means such that shopping list information can be retrieved and displayed on the display means, one or more microprocessors electronically coupled to said retrieval means, to said display means and to said keyboard input section for processing keyboard input data and to said memory means for controlling designed operational steps implemented in a plurality of device processor program instructions stored in said device memory means, where said designed operational steps are comprised of:

a continuously operating program control loop that inquires if a key has been pressed, a positive response causing the program to execute one of two subprograms, DO_CMND or WHAT_2_DO, said DO_CMND subprogram causing the keyboard to be read and interpreted through a series of logic queries, a negative response to each of said logic queries causing a read of a next logic query, determining whether selective function keys have been pressed, said selective keys including "SECOND", "INPUT" "COMPARE", "SCROLL", or "DELETE", or "COST";

a positive response to the first query causing key definition to flip between a primary key definition set and a secondary key definition set;

a positive response to the second query causing an execution of a subprogram "GET_INITEM" or a subroutine "SERIAL_DUMP", depending on whether a primary or secondary keyboard definition is active;

a positive response to the third query causing a read of the keyboard of two list items each with a keyboard entry of a price and a unit of measure, said entries followed by price comparison of the 2 items with results displayed on the display means;

a positive response to the fourth query causing list items to scroll in the display means;

a positive response to the fifth query causing deletion of list items;

a positive response to the sixth query causing execution of a subprogram "SEARCH_SUB" in the primary key definition set or a subprogram "EDIT_COST" in the secondary keyboard definition set, after which the DO_CMND subprogram is completed, and logic control is returned to the program control loop;

said WHAT_2_DO subprogram causing the keyboard to be read and interpreted through a series of logic queries, a negative response to each logic query causing a read of a next logic query, determining whether certain selective keys have been pressed, said keys including "UPARROW", "DOWNARROW", "QUANT" and "SEARCH", a positive response to each logic query respectively causing upward and downward movement of a cursor arrow in the display means through a list of items or data or execution of subprograms EDIT_QUANTITY", "SEARCH_SUB"; after which the WHAT_2-DO subprogram is completed and logic control is returned to the program control loop;

said subprogram GET_INITEM causing the keyboard to be read and interrupted and responding to selective keys being depressed, including keys "DELETE", "INPUT", and "SECOND", a positive response to which respectively causing (1) the subprogram to return logical control to a subprogram which caused execution of GET_INITEM; (2) to execute closing steps, said closing steps including filling remaining character positions with logical blanks up to the limited number of characters, then adding a new word to the item list, then initiating quantity and price values to zero unless the list is full in which case an error message is displayed, and then returning logical control to a subprogram which caused execution of GET_INITEM; and (3) to flip keyboard keys between primary and secondary key definitions followed by addition of a character represented by the depressed key to be added to a list and displayed on the display means and then logically branching to again wait for a further key to be depressed unless greater than a limited number of characters have been entered in which case said closing steps are executed;

said subprogram "SERIAL_DUMP" causing program execution one of three options in response to keyboard input through one of three selective keys, respectively causing addition of a newly defined item to a list, transmission of an entire list, transmission of a single item of a list, followed by return to a subprogram which caused execution of SERIAL DUMP;

said EDIT_COST subprogram comprising display on the display means of a list item indicated by the display cursor together with quantity and cost data for that item followed by keyboard entry of new cost data recorded in device memory unless a "DELETE" character is first encountered in which case the routine is exited without recording the new value;

said EDIT_QUANTITY subprogram comprising display on the display means of an item indicated by the display cursor together with quantity and cost data for that item followed by keyboard entry of new quantity data and new quantity unit of measure data recorded in device memory unless a "DELETE" character is first encountered in which case the routine is exited without recording the new value;

said SEARCH_SUB subprogram executing read of the keyboard, the subprogram returning to a subprogram which caused its execution if read of a "DELETE" key is found, recording as a new item in a list the last item searched and identified if an "INPUT" key is found, otherwise executing a further read of the keyboard for defining a desired list item, which item is retrieved from a memory-resident list of items and loaded into a user new list for creation of a user list from selected items in a memory-resident master list of items.

* * * * *